United States Patent
Li et al.

(10) Patent No.: US 11,223,569 B2
(45) Date of Patent: Jan. 11, 2022

(54) DEVICE, METHOD, AND SYSTEM THAT VIRTUALIZE A NETWORK

(71) Applicant: PrimeWan Limited, Causeway Bay (HK)

(72) Inventors: Ming Li, Beijing (CN); Yuan Yang Jia, Beijing (CN)

(73) Assignee: PrimeWan Limited, Causeway Bay (HK)

( * ) Notice: Subject to any disclaimer, the term of this patent is extended or adjusted under 35 U.S.C. 154(b) by 9 days.

(21) Appl. No.: 16/838,965

(22) Filed: Apr. 2, 2020

(65) Prior Publication Data

US 2021/0314272 A1     Oct. 7, 2021

(51) Int. Cl.
*H04L 12/891*     (2013.01)
*H04L 12/851*     (2013.01)

(52) U.S. Cl.
CPC .............. *H04L 47/41* (2013.01); *H04L 47/24* (2013.01)

(58) Field of Classification Search
CPC ................................ H04L 47/41; H04L 47/24
See application file for complete search history.

(56) References Cited

U.S. PATENT DOCUMENTS

| 9,860,011 | B2 | 1/2018 | Kim et al. |
| 2003/0118036 | A1 | 6/2003 | Gibson et al. |
| 2007/0153697 | A1* | 7/2007 | Kwan ................ H04L 47/6225 |
| | | | 370/235 |
| 2010/0166009 | A1 | 7/2010 | Huang et al. |
| 2011/0225303 | A1* | 9/2011 | Engebretson ....... H04L 67/1097 |
| | | | 709/227 |
| 2012/0027014 | A1* | 2/2012 | Mack-Crane ....... H04L 12/4666 |
| | | | 370/390 |
| 2012/0093034 | A1* | 4/2012 | Kamath .................. H04L 49/70 |
| | | | 370/255 |
| 2012/0163373 | A1 | 6/2012 | Lo et al. |
| 2012/0230680 | A1 | 9/2012 | Fujita et al. |
| 2012/0287786 | A1* | 11/2012 | Kamble ................ H04L 49/205 |
| | | | 370/235 |
| 2013/0336134 | A1* | 12/2013 | Bao ........................ H04L 41/046 |
| | | | 370/252 |
| 2014/0328158 | A1 | 11/2014 | Shao |
| 2015/0156250 | A1 | 6/2015 | Varshney et al. |
| 2016/0044695 | A1* | 2/2016 | Gunner ................ H04L 49/205 |
| | | | 370/336 |
| 2017/0019430 | A1 | 1/2017 | Cohn |

(Continued)

FOREIGN PATENT DOCUMENTS

| CN | 1207232 | 2/1999 |
| CN | 1852285 | 10/2006 |
| CN | 1946053 | 4/2007 |

(Continued)

*Primary Examiner* — Chi H Pham
*Assistant Examiner* — Weibin Huang

(57) ABSTRACT

A virtual circuit in a network device reformats one or more incoming data streams at a non-predetermined data rate into one or more outgoing data streams at a predetermined data rate, thereby allowing multiple data streams with non-predetermined data rates that are less than the predetermined data rate to be combined and output from a single network port, and a single data stream with a non-predetermined data rate that is greater than the predetermined data rate to be split and output from two or more network ports.

20 Claims, 9 Drawing Sheets

(56) References Cited

U.S. PATENT DOCUMENTS

2018/0083698 A1 3/2018 Hino et al.
2019/0020537 A1 1/2019 Sharma et al.

FOREIGN PATENT DOCUMENTS

| CN | 101286922 | 10/2008 |
| CN | 102238091 | 11/2011 |
| CN | 103107932 | 5/2013 |
| CN | 103209110 | 7/2013 |
| CN | 103428061 | 12/2013 |
| CN | 105978656 | 9/2016 |
| CN | 110213040 | 9/2019 |
| WO | 2015127643 | 9/2015 |

* cited by examiner

DEVICE, METHOD, AND SYSTEM THAT VIRTUALIZE A NETWORK

BACKGROUND OF THE INVENTION

1. Field of the Invention

The present application relates to the field of computer networks and, in particular, to a network device, method, and system that virtualize a network.

2. Description of the Related Art

Conventional computer systems typically include a network interface controller/card (NIC) that has the functionality of connecting a computer system to the Internet or other type of network. Conventional NICs include one or more network ports that operate at a predetermined fixed data rate, such as for example, 10/100/1000 Mbps (megabits per second), 10 Gbps (gigabits per second), 40 Gbps, and 100 Gbps connection. As part of enabling communication between the computer systems over a network, conventional NICs negotiate the transfer speed of a network port and, during that process, the transfer speed of the network port is fixed.

One of the disadvantages of conventional NICs is that the predetermined fixed transfer rate of the port lacks the flexibility to handle the traffic of an application that wishes to transfer data at a non-predetermined data rate. For example, the traffic of a video conferencing application may exceed the physical limitations of the network port which would result in undesirable packet loss and latency, thereby degrading the video conferencing experience of its users. As a result, there is a need for an approach to handle the traffic of an application that wishes to transfer data at a non-predetermined data rate.

SUMMARY OF THE INVENTION

The present invention provides an approach to handling the traffic of an application that wishes to transfer data at a non-predetermined data rate. The present invention provides a network device that includes a plurality of physical transceiver ports. The plurality of physical transceiver ports transfer data across a network at a predetermined fixed data rate. The network device also includes a virtual circuit coupled to the plurality of physical transceiver ports. The virtual circuit to receive a first transfer request from a processor to transmit a first incoming data stream at a first non-predetermined data rate, and establish a first virtual port to receive the first incoming data stream. The virtual circuit to also select one or more physical transceiver ports from the plurality of physical transceiver ports to form one or more selected physical transceiver ports in response to the first transfer request where the one or more selected physical transceiver ports have a total predetermined fixed data rate that is greater than the first non-predetermined data rate. The virtual circuit to further receive the first incoming data stream from the processor through the virtual port after the one or more physical transceiver ports have been selected. In addition, the virtual circuit to form one or more output data streams to run at the predetermined fixed data rate. The one or more output data streams to incorporate the data from the first incoming data stream. The data from the first incoming data stream that is incorporated within the one or more output data streams is timed to selected pulses within a transmit clock signal that runs at the predetermined fixed data rate. Further, the virtual circuit to forward the one or more output data streams to the one or more selected physical transceiver ports.

The present invention also includes a method of operating a network device. The method includes receiving a first transfer request from a processor to transmit a first incoming data stream at a first non-predetermined data rate, and establishing a virtual port to receive the first incoming data stream. The method also includes selecting one or more physical transceiver ports that transmit data across a network at a predetermined fixed data rate from a plurality of physical transceiver ports to form one or more selected physical transceiver ports where the one or more selected physical transceiver ports have a total predetermined fixed data rate that is greater than the first non-predetermined data rate. In addition, the method includes receiving the first incoming data stream from the processor through the virtual port after the one or more physical transceiver ports have been selected, and forming one or more output data streams to run at the predetermined fixed data rate. The one or more output data streams incorporate the data from the first incoming data stream. The data from the first incoming data stream that is incorporated within the one or more output data streams is timed to selected pulses within a transmit clock signal that runs at the predetermined fixed data rate. Further, the method includes forwarding the one or more output data streams to the one or more selected physical transceiver ports.

The present invention also provides a network system. The network system includes a network, a first network device coupled to the network, and a second network device coupled to the network. The first network device has a plurality of first physical transceiver ports that transfer data across the network at a predetermined fixed data rate, and a first virtual circuit coupled to the plurality of first physical transceiver ports. The first virtual circuit to receive a first transfer request from a processor to transmit a first incoming data stream at a first non-predetermined data rate, and establish a virtual port to receive the first incoming data stream. The first virtual circuit to also select one or more first physical transceiver ports from the plurality of first physical transceiver ports to form one or more selected first physical transceiver ports where the one or more selected first physical transceiver ports have a total predetermined fixed data rate that is greater than the first non-predetermined data rate. In addition, the first virtual circuit to receive the first incoming data stream from the processor through the virtual port after the one or more first physical transceiver ports have been selected. The first virtual circuit to further form one or more output data streams to run at the predetermined fixed data rate. The one or more output data streams to incorporate the data from the first incoming data stream. The data from the first incoming data stream that is incorporated within the one or more output data streams is timed to selected pulses within a transmit clock signal that runs at the predetermined fixed data rate. The first virtual circuit to additionally forward the one or more output data streams to the one or more selected physical transceiver ports. The second network device has a plurality of second physical transceiver ports that transfer data across the network, and a second virtual circuit coupled to the plurality of second physical transceiver ports. The second virtual circuit to receive a first network request from the first virtual circuit to receive the one or more output data streams at the first non-predetermined data rate from the one or more selected physical transceiver ports. The second virtual circuit to also select one or more second physical transceiver ports from the plurality of second physical transceiver ports to form one or more selected second physical transceiver ports that correspond with the one or more selected first physical transceiver ports in response to the request from the first virtual circuit where the one or more selected second physical transceiver ports have a combined predetermined fixed data rate that is greater than the first non-predetermined data rate. In addition, the second virtual circuit to receive the one or more output data streams from the first network device with the selected one or more second physical transceiver ports.

The present invention additionally provides a non-transitory computer-readable storage medium having embedded therein program instructions, which when executed by a processor causes the processor to execute a method of operating a network device. The method includes receiving a first transfer request from a processor to transmit a first incoming data stream at a first non-predetermined data rate, and establishing a virtual port to receive the first incoming data stream. The method also includes selecting one or more physical transceiver ports that transmit data across a network at a predetermined fixed data rate from a plurality of physical transceiver ports to form one or more selected physical transceiver ports where the one or more selected physical transceiver ports have a total predetermined fixed data rate that is greater than the first non-predetermined data rate. In addition, the method includes receiving the first incoming data stream from the processor through the virtual port after the one or more physical transceiver ports have been selected, and forming one or more output data streams to run at the predetermined fixed data rate. The one or more output data streams incorporate the data from the first incoming data stream. The data from the first incoming data stream that is incorporated within the one or more output data streams is timed to selected pulses within a transmit clock signal that runs at the predetermined fixed data rate. Further, the method includes forwarding the one or more output data streams to the one or more selected physical transceiver ports.

A better understanding of the features and advantages of the present invention will be obtained by reference to the following detailed description and accompanying drawings which set forth an illustrative embodiment in which the principals of the invention are utilized.

A better understanding of the features and advantages of the present invention will be obtained by reference to the following detailed description and accompanying drawings which set forth an illustrative embodiment in which the principals of the invention are utilized.

DETAILED DESCRIPTION OF THE INVENTION

Figure 1:
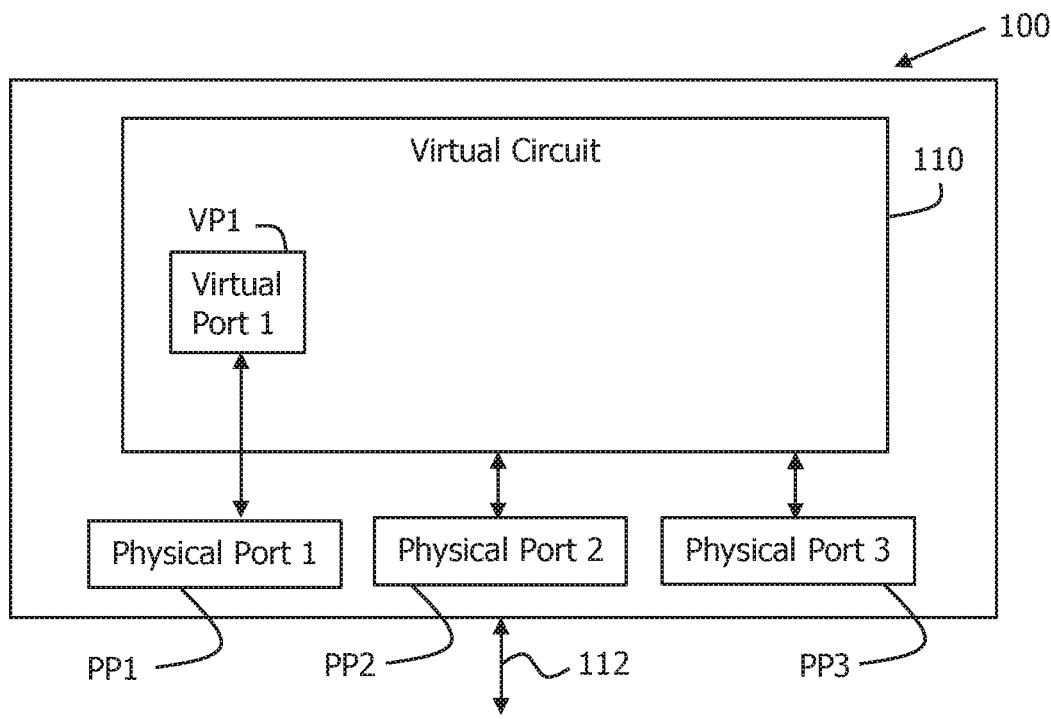
FIG. 1 is a block diagram illustrating an example of a network device 100 in accordance with the present invention.

FIG. 1 shows a block diagram that illustrates an example of a network device 100 in accordance with the present invention. As described in greater detail below, a virtual circuit in a network device reformats one or more incoming data streams at a non-predetermined data rate into one or more outgoing data streams at a predetermined fixed data rate which, in turn, allows multiple data streams with non-predetermined data rates that are less than the predetermined fixed data rate to be combined and output from a single network port, and a single data stream with a non-predetermined data rate that is greater than the predetermined fixed data rate to be split and output from two or more network ports.

As shown in FIG. 1, network device 100 includes a virtual circuit 110 that reformats incoming data streams, and a series of physical transceiver ports PP that are coupled to virtual circuit 110 to transmit and receive reformatted data streams. In the present example, three physical transceiver ports PP1-PP3 are illustrated, although other numbers of ports can be used.

Virtual circuit 110 includes processing, switching, buffering, and timing circuitry, which include software modules where appropriate. The physical transceiver ports PP transfer data across a network 112 at a predetermined fixed data rate, which can include, for example, one or more of 10/100/1000 Mbps (megabits per second), 10 Gbps (gigabit per second), 40 Gbps, and 100 Gbps.

In operation, virtual circuit 110 receives a first transfer request from an application executing on a processor to transmit a first incoming data stream to a remote device via network 112 at a first non-predetermined data rate. The first non-predetermined data rate can be any non-standard data rate, such as 16 Mpbs or 128 Mbps.

In response to the first transfer request, virtual circuit 110 establishes a virtual port VP1 to receive the first incoming data stream from the processor. For example, establishing a virtual port can include assigning an amount of memory to function as a FIFO buffer for the first incoming data stream. In addition, virtual circuit 110 selects one or more physical transceiver ports PP that have a total predetermined fixed data rate that is greater than the first non-predetermined data rate.

As illustrated in FIG. 1, when the first non-predetermined data rate (e.g., 16 Mbps) of the first incoming data stream is less than the predetermined fixed data rate (e.g., 100 Mbps) of a physical transceiver port PP, virtual circuit 110 selects a physical transceiver port PP, such as physical transceiver port PP1, that has a predetermined fixed data rate (e.g., 100 Mbps) that is greater than the first non-predetermined data rate (e.g., 16 Mbps) of the first incoming data stream. Following the selection, virtual circuit 110 modifies the switching circuitry to couple virtual port VP1 to physical transceiver port PP1 via the processing, buffering, and timing circuitry of virtual circuit 110.

Following this, virtual circuit 110 acknowledges acceptance of the first transfer request back to the processor, subsequently receives the first incoming data stream through virtual port VP1 at the first non-predetermined data rate, and then forms one or more output data streams at the predetermined fixed data rate that incorporates the data from the first incoming data stream.

The data from the first incoming data stream that is incorporated within the one or more output data streams is timed to selected pulses within a transmit clock signal that runs at the predetermined fixed data rate. When completed, virtual circuit 110 forwards the one or more output data streams to the one or more selected physical transceiver ports.

Figure 2:
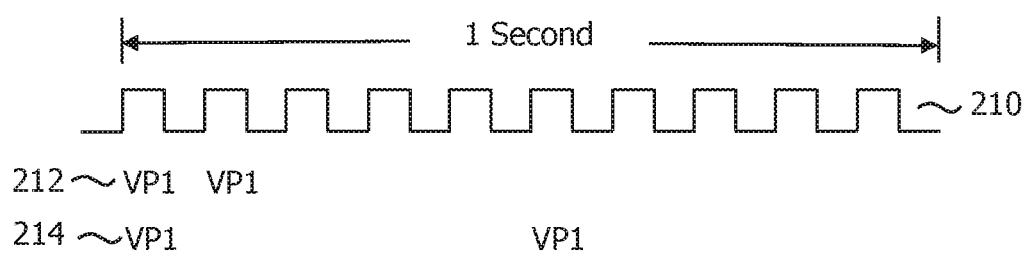
FIG. 2 is a timing diagram illustrating an example of clocking the data from an incoming data stream to selected pulses within a transmit clock signal in accordance with the present invention.

FIG. 2 shows a timing diagram that illustrates an example of clocking the data from an incoming data stream to selected pulses within a transmit clock signal in accordance with the present invention. In the FIG. 2 example, a transmit clock signal 210 is shown operating at a predetermined fixed rate of 10 cycles per second.

If a virtual circuit receives a data stream from a virtual port that has a non-predetermined data rates of 2 cycles per second, then, as illustrated by line 212, clocks the data from the first two clock cycles of the data stream to the first two clock cycles of the 10 predetermined fixed cycles of transmit clock signal 210.

In addition, as shown by line 214 in FIG. 2, the buffered data from first two clock cycles of the data stream can be clocked to any of the clock cycles of the 10 predetermined fixed cycles per second. The FIG. 2 example is a simplified example to illustrate the timing. In actual practice, a virtual port may, for example, receive data streams with data rates of 16 Ghz, which are buffered and clocked in the manner illustrated by FIG. 2, and output to a physical transceiver port that has a predetermined fixed data rate of 100 Ghz.

Referring again to FIG. 1, at a subsequent time, virtual circuit 110 can receive a second transfer request from an application executing on the processor to transmit a second incoming data stream to a remote device via network 112 at a second non-predetermined data rate. The second non-predetermined data rate can be the same as or different from first non-predetermined data rate.

In response to the second transfer request, virtual circuit 110 establishes a virtual port VP2 to receive the second incoming data stream from the processor. For example, establishing a virtual port can include assigning an amount of memory to function as a FIFO buffer for the second incoming data stream. In addition, virtual circuit 110 determines whether the selected physical transceiver port PP1 has an available data rate that is greater than the second non-predetermined data rate.

For example, virtual circuit 110 can determine whether selected physical transceiver port PP1 has an available data rate that is greater than the second non-predetermined data rate by subtracting the first non-predetermined data rate (e.g., 16 Mbps) of the first incoming data stream from the predetermined fixed data rate (e.g., 100 Mbps) to obtain the available data rate (e.g., 84 Mbps), and then comparing the available data rate (e.g., 84 Mbps) to the second non-predetermined data rate (e.g., 32 Mbps) to determine if the available data rate (e.g., 84 Mbps) is greater than the second non-predetermined data rate (e.g., 32 Mbps).

When the available data rate of the selected physical transceiver port PP1 is greater than the second non-predetermined data rate, virtual circuit 110 modifies the switching circuitry to couple both virtual port VP1 and virtual port VP2 to physical transceiver port PP1 via the processing, buffering, and timing circuitry of virtual circuit 110.

Figure 3:
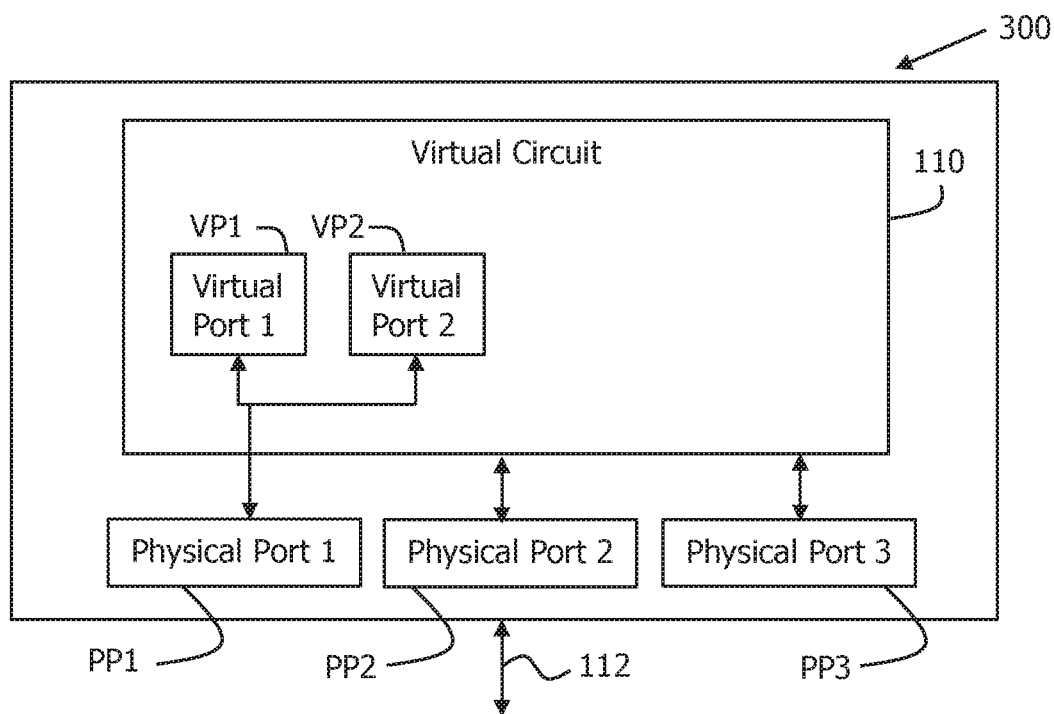
FIG. 3 is a block diagram illustrating an example of a network device 300 in accordance with the present invention.

FIG. 3 shows a block diagram that illustrates an example of a network device 300 in accordance with the present invention. Network device 300 is similar to network device 100 and, as a result, utilizes the same reference numerals to designate the structures that are common to both network devices. As shown in FIG. 3, network device 300 differs from network device 100 in that virtual circuit 110 has received a second transfer request, established a second virtual port VP2, determined that physical transceiver port PP1 has an available data rate, and connected both the first and second incoming data streams to physical transceiver port PP1 through the processing, switching, buffering, and timing circuitry of virtual circuit 110.

Following this, virtual circuit 110 acknowledges acceptance of the second transfer request back to the processor, subsequently receives the second incoming data stream through virtual port VP2 at the second non-predetermined data rate, and then generates a revised output data stream at the predetermined fixed data rate that incorporates the data from both the first incoming data stream and the second incoming data stream. As before, the first incoming data stream and the second incoming data stream are clocked to selected transmit clock signals. Virtual circuit 110 then forwards the revised output data stream to the selected physical transceiver port.

The predetermined fixed data rate has a data rate of x bits per second. In one embodiment, virtual circuit 110 subdivides the predetermined fixed data rate of x bits per second of a physical transceiver port into fractional parts, assigns the fractional parts to the first and second incoming data streams with non-predetermined data rates that are less than the predetermined fixed data rate of the physical transceiver port, and combines the fractional parts such that the combined bits per second of the combined data stream are equal to or less than the predetermined fixed data rate of x bits per second of the physical transceiver port.

For example, when the first non-predetermined data rate is 16 Mbps and the second non-predetermined data rate is 32 Mbps, then 16 Mbps of the 100 Mbps fractional part is mapped to the first non-predetermined data rate, while 32

Mbps of the 100 Mbps fractional part is mapped to the second non-predetermined data rate.

Figure 4:
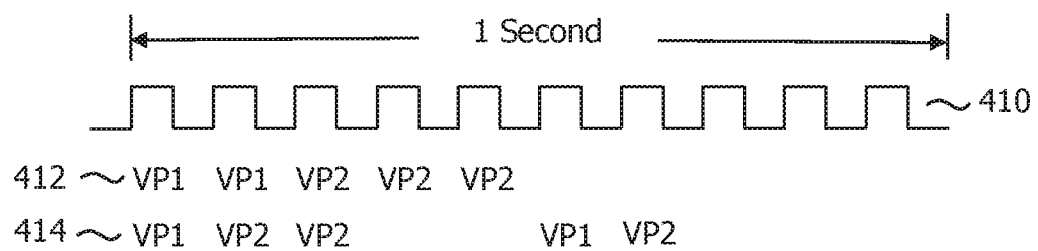
FIG. 4 is a timing diagram illustrating an example of the data from two incoming data streams being clocked to selected pulses within a transmit clock signal in accordance with the present invention.

FIG. 4 shows a timing diagram that illustrates an example of the data from two incoming data streams being clocked to selected pulses within a transmit clock signal in accordance with the present invention. In the FIG. 4 example, a transmit clock signal 410 is shown operating at a predetermined fixed rate of 10 cycles per second.

If a virtual circuit receives a data stream from a first virtual port that has a non-predetermined data rates of 2 cycles per second, and a data stream from a second virtual port that has a non-predetermined data rates of 3 cycles per second, then, as illustrated by line 412, the virtual circuit clocks the data from the first two clock cycles of the first data stream to the first two clock cycles of the 10 predetermined fixed cycles of transmit clock signal 410, and clocks the data from the first three clock cycles of the second data stream to the third, fourth, and fifth clock cycles of the 10 predetermined fixed cycles of transmit clock signal 410.

In addition, as shown by line 414 in FIG. 4, the buffered data from first two clock cycles of the first data stream and the buffered data from the first three clock cycles of the second data stream can be clocked to any of the clock cycles of the 10 predetermined fixed cycles per second. The FIG. 4 example is a simplified example to illustrate the timing. In actual practice, virtual ports VP1 and VP2 may, for example, receive data streams with data rates of 16 Ghz and 32 Ghz, respectively, which are clocked in the manner illustrated by FIG. 4, and output to a physical transceiver port that has a predetermined fixed data rate of 100 Ghz.

Figure 5:
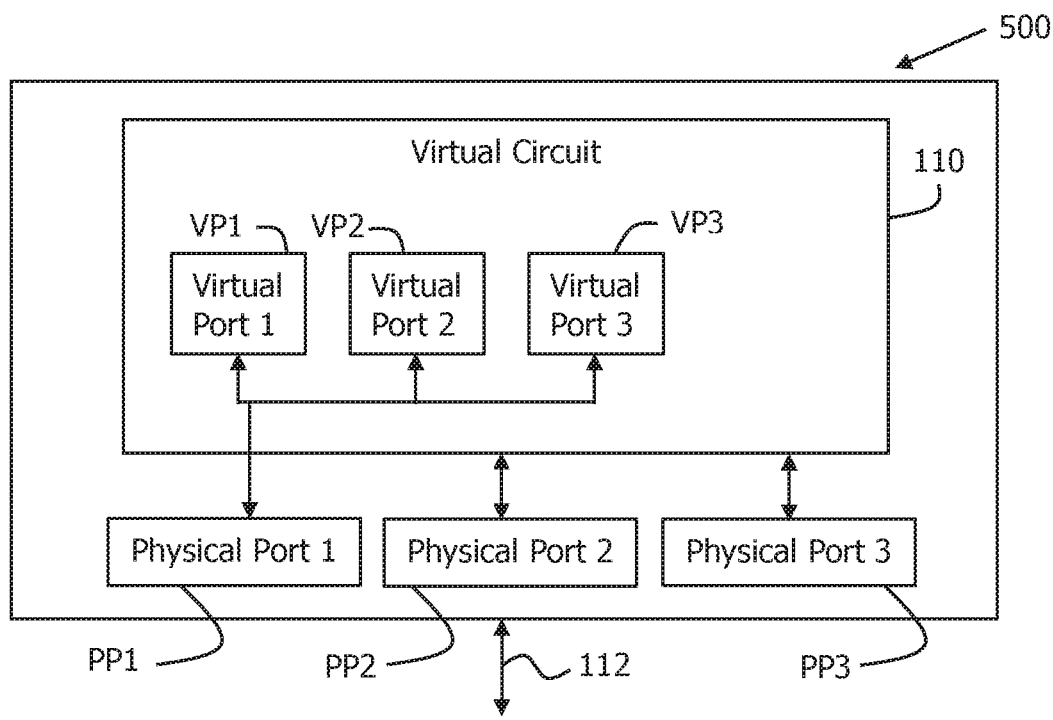
FIG. 5 is a block diagram illustrating an example of a network device 500 in accordance with the present invention.

FIG. 5 shows a block diagram that illustrates an example of a network device 500 in accordance with the present invention. Network device 500 is similar to network device 300 and, as a result, utilizes the same reference numerals to designate the structures that are common to both network devices. As shown in FIG. 5, network device 500 differs from network device 300 in that virtual circuit 110 has received a third transfer request, established a third virtual port VP3, determined that physical transceiver port PP1 has available data rate, and connected the first, second, and third incoming data streams to physical transceiver port PP1 through the processing, switching, buffering, and timing circuitry of virtual circuit 110.

Figure 6A:
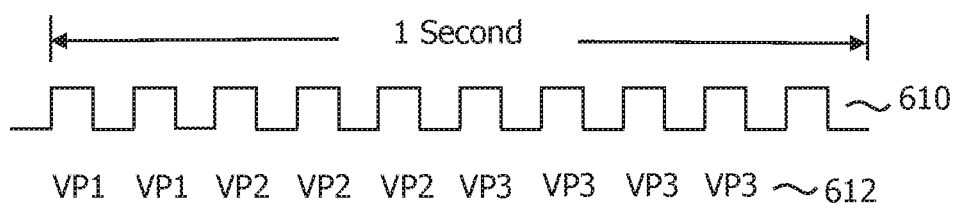
FIG. 6A is a timing diagram illustrating an example of the data from three incoming data streams being clocked to selected pulses within a transmit clock signal in accordance with the present invention.

FIG. 6A shows a timing diagram that illustrates an example of the data from three incoming data streams being clocked to selected pulses within a transmit clock signal in accordance with the present invention. In the FIG. 6A example, a transmit clock signal 610 is shown operating at a predetermined fixed rate of 10 cycles per second.

If a virtual circuit receives a data stream from a first virtual port that has a non-predetermined data rate of 2 cycles per second, a data stream from a second virtual port that has a non-predetermined data rate of 3 cycles per second, and a data stream from a third virtual port that has a non-predetermined data rate of 4 cycles per second, then, as illustrated by line 412, the virtual circuit clocks the data from the first two clock cycles of the first data stream to the first two clock cycles of the 10 predetermined fixed cycles per second, clocks the data from the first three clock cycles of the second data stream to the third, fourth, and fifth clock cycles of the 10 predetermined fixed cycles per second, and clocks the data from the first four clock cycles of the third data stream to the sixth, seventh, eighth, and ninth clock cycles of the 10 predetermined fixed cycles per second. The last cycle in this example is empty. Ideally, the virtual ports are grouped so that all of the predetermined fixed clock cycles are utilized.

In addition, as shown by line 614 in FIG. 6A, the data from first two clock cycles of the first data stream, the data from the first three clock cycles of the second data stream, and the data from the first four clock cycles of the third data stream can be clocked to any of the clock cycles of the 10 predetermined fixed cycles of the transmit clock signal 610.

The FIG. 6A example is a simplified example to illustrate the timing. In actual practice, virtual ports VP1, VP2, VP3 may, for example, receive data streams with data rates of 16 Ghz, 32 Ghz, and 48 Ghz, respectively, which are clocked in the manner illustrated by FIG. 6A, and output to a physical transceiver port that has a predetermined fixed data rate of 100 Ghz.

Referring again to FIG. 5, as noted above, a virtual port can include an amount of memory that functions as a FIFO buffer for an incoming data stream at a non-predetermined data rate. The FIFO buffers that receive the incoming data streams can alternately operate as token buckets which are periodically filled with a token and emptied when full. Tokens can be implemented with, for example, data packets. When a token bucket is full, virtual circuit 110 transfers all of the tokens from the bucket to the physical transceiver port at the predetermined fixed data rate of the physical transceiver port.

Figure 6B:
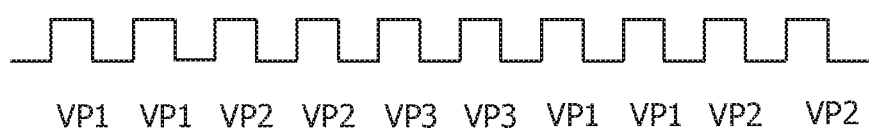
FIG. 6B is a timing diagram illustrating an example of a token bucket timing diagram in accordance with the present invention.

FIG. 6B shows a timing diagram that illustrates an example of a token bucket timing diagram in accordance with the present invention. In the FIG. 6B example, each pulse represents a packet number of clock cycles, and each token bucket holds two tokens or data packets. As shown in FIG. 6B, virtual circuit 110 empties the VP1 token bucket by clocking two VP1 packet data streams to selected pulses within a transmit clock signal, and outputting the clocked data streams to the physical transceiver port at the predetermined fixed data rate of the physical transceiver port, followed by emptying the VP2 and VP3 buckets in a similar manner.

One of the advantages of the present invention is that multiple data streams can be isolated in one physical transceiver port. For example, a physical transceiver port with a data rate of 100 Mbps can be used to transmit 10 Mbps of video conference traffic, 50 Mbps for ERP, 30 Mbps for boss, and 10 Mbps for the staff. In addition, "A to Z" quality of service (QoS) can be guaranteed for all of the traffic. An additional advantage is that the present invention provides accurate traffic control.

Figure 7:
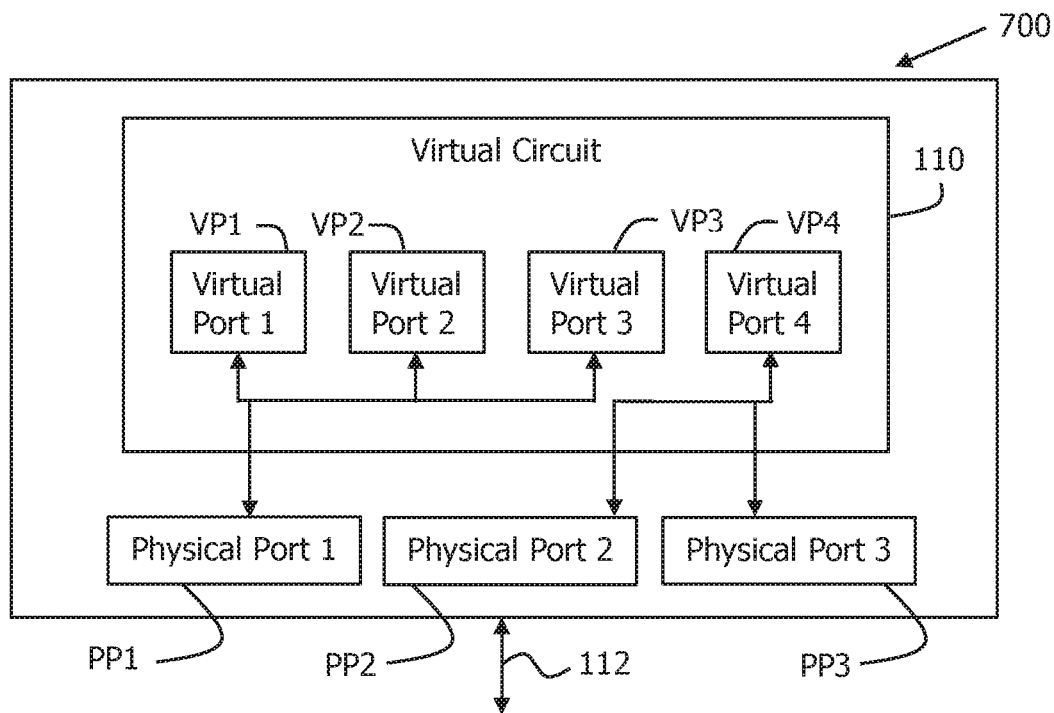
FIG. 7 is a block diagram illustrating an example of a network device 700 in accordance with the present invention.

FIG. 7 shows a block diagram that illustrates an example of a network device 700 in accordance with an embodiment of the present invention. Network device 700 is similar to network device 500 and, as a result, utilizes the same reference numerals to designate the structures that are common to both network devices.

As shown in FIG. 7, virtual circuit 110 receives a fourth transfer request from an application executing on the processor to transmit a fourth incoming data stream to a remote device via network 112 at a fourth non-predetermined data rate. In response to the fourth transfer request, virtual circuit 110 establishes a virtual port VP4 to receive the fourth incoming data stream from the processor. For example, establishing a virtual port can include assigning an amount of memory to function as a FIFO buffer for the fourth incoming data stream. In addition, virtual circuit 110 selects one or more physical transceiver ports PP from the number of physical transceiver ports PP that have a total predetermined fixed data rate that is greater than the first non-predetermined data rate.

As illustrated in FIG. 7, when the fourth non-predetermined data rate (e.g., 128 Mbps) of the fourth incoming data stream is greater than the predetermined fixed data rate (e.g., 100 Mbps) of a physical transceiver port PP, virtual circuit 110 selects two or more physical transceiver ports, such as physical transceiver ports PP2 and PP3, where the two or more selected physical transceiver ports have a combined predetermined fixed data rate that is greater than the fourth non-predetermined data rate of the fourth incoming data stream.

Following this, virtual circuit 110 acknowledges acceptance of the fourth transfer request back to the processor, subsequently receives the fourth incoming data stream through virtual port VP4 at the fourth non-predetermined data rate, and then splits the fourth incoming data stream received from virtual port VP4 into two or more split data streams that correspond with the two or more selected physical transceiver ports PP2 and PP3, where each of the two or more split data streams have data rates that are smaller than the predetermined fixed data rate.

Next, virtual circuit 110 forms two or more output data streams to run at the predetermined fixed data rate, where the two or more output data streams incorporate the data from the two or more split data streams. The data from the split data streams that is incorporated within the two or more output data streams is clocked to selected pulses within the transmit clock signal. When completed, virtual circuit 110 forwards the two or more output data streams to the two or more selected physical transceiver ports PP2 and PP3.

Figure 8:
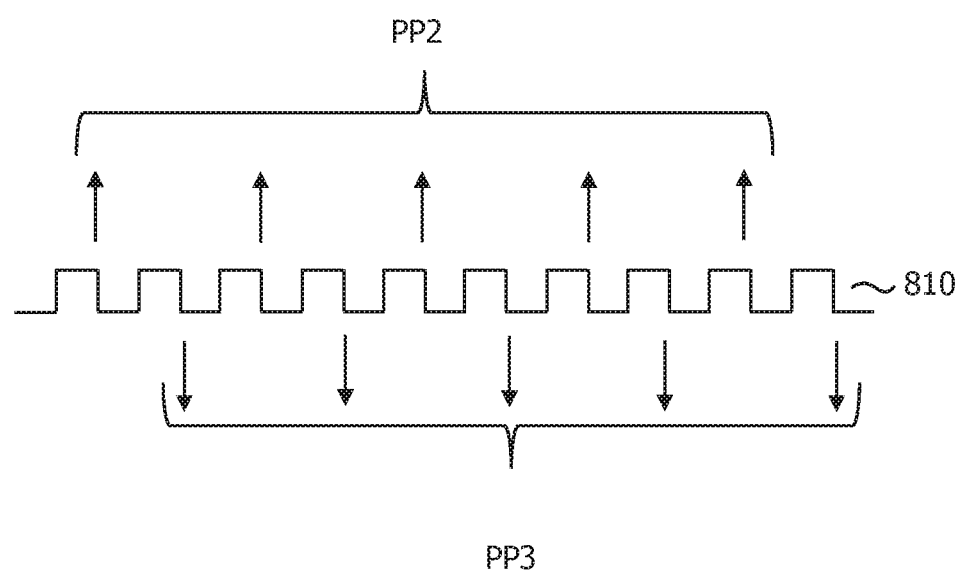
FIG. 8 is a timing diagram illustrating an example of splitting the data in a data stream in accordance with the present invention.

FIG. 8 shows a timing diagram that illustrates an example of splitting the data in a data stream in accordance with the present invention. As shown in FIG. 8, virtual circuit 110 can split the data in the data stream in two by, for example, forwarding every odd bit to physical port PP2, and every even bit to physical port PP3, after being incorporated into an output data stream in the manner described above. The split effectively forms two smaller data streams with smaller data rates.

Alternately, virtual circuit 110 can split the data in the data stream by forwarding data at a data rate (e.g., 100 Mbps) that matches the predetermined fixed data rate (e.g., 100 Mbps) of physical port PP2, and forwarding the remaining data at a data rate (e.g., 28 Mbps) to physical port PP3 in the manner described above. In most cases, the number of physical transceiver ports PP is a smallest number required to accommodate the fourth non-predetermined data rate.

Figure 9:
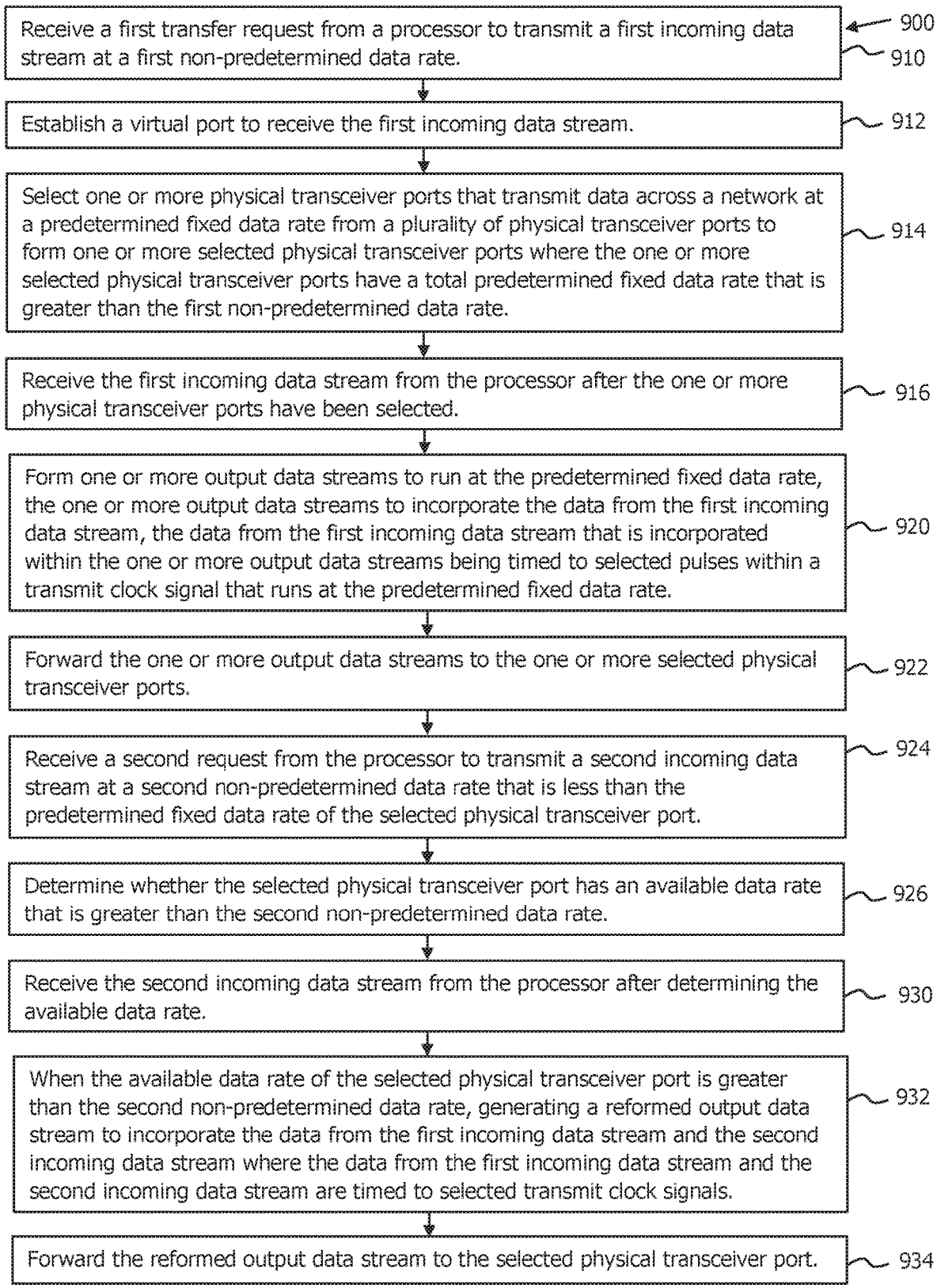
FIG. 9 is a flow chart illustrating an example of a method 900 of operating a virtual circuit in accordance with the present invention.

FIG. 9 shows a flow chart that illustrates an example of a method 900 of operating a virtual circuit in accordance with the present invention. As shown in FIG. 9, method 900 begins at 910 by receiving a first transfer request from a processor to transmit a first incoming data stream at a first non-predetermined data rate. The first non-predetermined data rate can be any non-standard data rate, such as 16 Mpbs or 128 Mbps.

Method 900 next moves to 912 to establish a virtual port to receive the first incoming data stream. After this, method 900 moves to 914 to select one or more physical transceiver ports that transmit data across a network at a predetermined fixed data rate from a plurality of physical transceiver ports to form one or more selected physical transceiver ports where the one or more selected physical transceiver ports have a total predetermined fixed data rate that is greater than the first non-predetermined data rate.

Following this, method 900 moves to 916 to receive the first incoming data stream from the processor after the one or more physical transceiver ports have been selected, and then to 920 to form one or more output data streams to run at the predetermined fixed data rate. The one or more output data streams incorporate the data from the first incoming data stream. The data from the first incoming data stream that is incorporated within the one or more output data streams is timed to selected pulses within a transmit clock signal that runs at the predetermined fixed data rate. Method then moves to 922 to forward the one or more output data streams to the one or more selected physical transceiver ports.

When the first non-predetermined data rate of the first incoming data stream is less than the predetermined fixed data rate of a physical transceiver port, method 900 selects a physical transceiver port from the plurality of physical transceiver ports to form a selected physical transceiver port where the selected physical transceiver port has a predetermined fixed data rate that is greater than the first non-predetermined data rate of the first incoming data stream. In addition, method 900 forms an output data stream to run at the predetermined fixed data rate that corresponds with the selected physical transceiver port. The output data stream to incorporate the data from the incoming data stream. The data from the incoming data stream incorporated within the output data stream being timed to selected pulses within the transmit clock signal.

When the first non-predetermined data rate of the first incoming data stream is greater than the predetermined fixed data rate of a physical transceiver port, method 900 selects two or more physical transceiver ports from the plurality of physical transceiver ports where the two or more selected physical transceiver ports have a combined predetermined fixed data rate that is greater than the non-predetermined data rate of the incoming data stream.

In addition, method 900 splits the incoming data stream received from the virtual port into two or more split data streams that correspond with the two or more selected physical transceiver ports. Each of the two or more split data streams having a smaller non-predetermined data rates than the non-predetermined data rate of the incoming data stream. Further, method 900 forms two or more output data streams to run at the predetermined fixed data rate. The two or more output data streams to incorporate the data from the two or more split data streams. The data from the split data streams incorporated within the two or more output data streams being timed to selected pulses within the transmit clock signal.

Referring again to FIG. 9, method 900 next moves to 924 to receive a second transfer request from the processor to transmit a second incoming data stream at a second non-predetermined data rate that is less than the predetermined fixed data rate of the selected physical transceiver port. After this, method 900 moves to 926 to determine if the selected physical transceiver port has an available data rate that is greater than the second non-predetermined data rate.

After determining the available data rate, method 900 moves to 930 to receive the second incoming data stream from the processor. When the available data rate of the selected physical transceiver port is greater than the second non-predetermined data rate, method 900 moves to 932 to generate a reformed output data stream to incorporate the data from the first incoming data stream and the second incoming data stream where the data from the first incoming data stream and the second incoming data stream are timed to selected transmit clock signals. Following this, method 900 moves to 934 to forward the reformed output data stream to the selected physical transceiver port. In an embodiment, method 900 can be stored on a non-transitory computer-readable storage medium having embedded therein program instructions, which when executed by a processor causes the processor to execute method 900.

Figure 10:
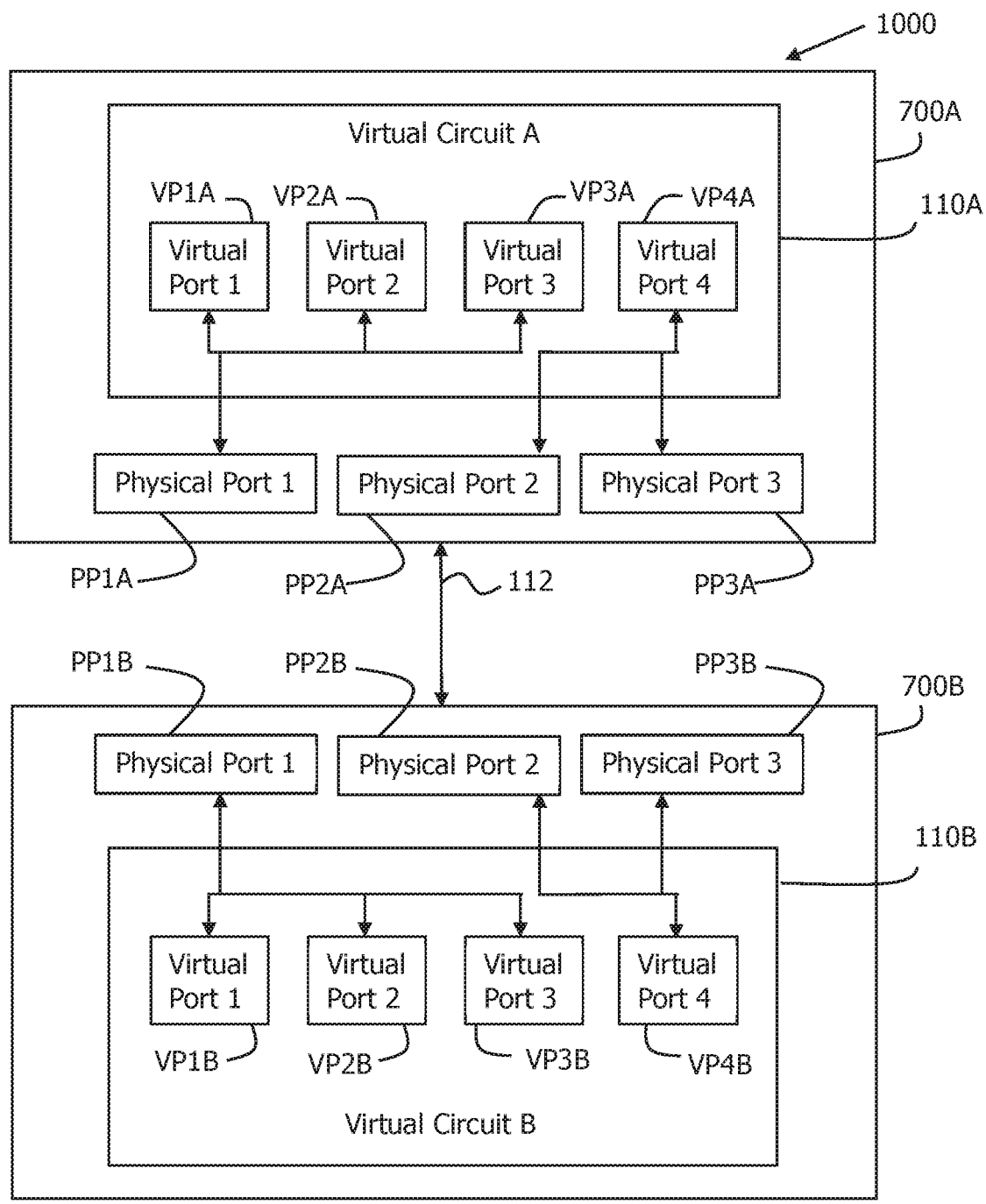
FIG. 10 is a block diagram illustrating an example of a network system 1000 in accordance with the present invention.

FIG. 10 shows a block diagram that illustrates an example of a network system 1000 in accordance with the present invention. Network system 1000 includes a first network device, a second network device, and a network that couples the first and second network devices 1010A and 1010B together.

As shown in FIG. 10, the first network device can be implemented with network device 700, represented as 700A, and represents 110 as 110A, PP1-PP3 as PP1A-PP3A, and VP1-VP4 as VP1A-VP4A. Similarly, the second network device can also be implemented with network device 700, represented as 700B, and represents 110 as 110B, PP1-PP3 as PP1B-PP3B, and VP1-VP4 as VP1B-VP4B.

In operation, virtual circuit 110A receives a first transfer request from an application executing on a processor to transmit a first incoming data stream to a remote device via network 112 at a first non-predetermined data rate. The first non-predetermined data rate can be any non-standard data rate, such as 16 Mpbs or 128 Mbps.

In response to the first transfer request, virtual circuit 110A establishes a virtual port VP1 to receive the first incoming data stream from the processor, and then selects one or more physical transceiver ports PPA from the number of physical transceiver ports PPA that have a total predetermined fixed data rate that is greater than the first non-predetermined data rate.

Following this, virtual circuit 110A acknowledges acceptance of the first transfer request back to the processor, subsequently receives the first incoming data stream through virtual port VP1A at the first non-predetermined data rate, and then forms an output data stream at the predetermined fixed data rate that incorporates the data from the first incoming data stream.

The data from the first incoming data stream that is incorporated within the output data stream is timed to selected pulses within a transmit clock signal that runs at the predetermined fixed data rate. When completed, virtual circuit 110A forwards the one or more output data streams to the one or more selected physical transceiver ports which, in turn, transmit the one or more output data streams across network 112 to second network device 700B.

Before transmitting the output data stream across network 112, selected physical transceiver device PP1A of the first network device 700A sends a network request to second network device 700B to receive the one or more output data streams at the first non-predetermined data rate from the one or more selected physical transceiver ports.

Virtual circuit 110B of second network device 700B receives the first network request and, in response, selects one or more second physical transceiver ports from the series of second physical transceiver ports that correspond with the one or more selected first physical transceiver ports, where the one or more selected second physical transceiver ports have a total predetermined fixed data rate that is greater than the first non-predetermined data rate.

Following this, virtual circuit 110B acknowledges acceptance of the first network request back to first network device 700A, and subsequently receives the one or more outgoing data streams at the first non-predetermined data rate via the physical transceiver ports PP1B-PP3B.

Next, virtual circuit 110B extracts the data from the first incoming data stream that is incorporated within the one or more output data streams from the one or more output data streams to form one or more reconstituted data streams that run at the first non-predetermined fixed data rate, the one or more reconstituted data streams substantially matching the one or more first incoming data streams. Virtual circuit 110B then forwards the one or more reconstituted data streams to a second processor.

When the first non-predetermined data rate of the first incoming data stream is less than the predetermined fixed data rate of a physical transceiver port PPA, first virtual circuit 110A selects a first physical transceiver port PP1A from the series of first physical transceiver ports to form a selected first physical transceiver port where the selected first physical transceiver port has a predetermined fixed data rate that is greater than the first non-predetermined data rate of the first incoming data stream. Further, second virtual circuit 110B selects a second physical transceiver port PP1B from the plurality of second physical transceiver ports to form a selected second physical transceiver port where the selected second physical transceiver port has a corresponding selected first physical transceiver port PP1A, and a predetermined fixed data rate that is greater than the first non-predetermined data rate of the first incoming data stream.

When the first non-predetermined data rate of the first incoming data stream is greater than the predetermined fixed data rate of a physical transceiver port, first virtual circuit 110A selects two or more first physical transceiver ports from the plurality of first physical transceiver ports, such as PP2A and PP3A, where the two or more selected first physical transceiver ports have a combined predetermined fixed data rate that is greater than the non-predetermined data rate of the incoming data stream. Further, second virtual circuit 110B selects two or more second physical transceiver ports, such as PP2B and PP3B, from the plurality of second physical transceiver ports that correspond with the selected two or more first physical transceiver ports where the two or more selected second physical transceiver ports have a combined predetermined fixed data rate that is greater than the non-predetermined data rate of the incoming data stream.

Figure 11:
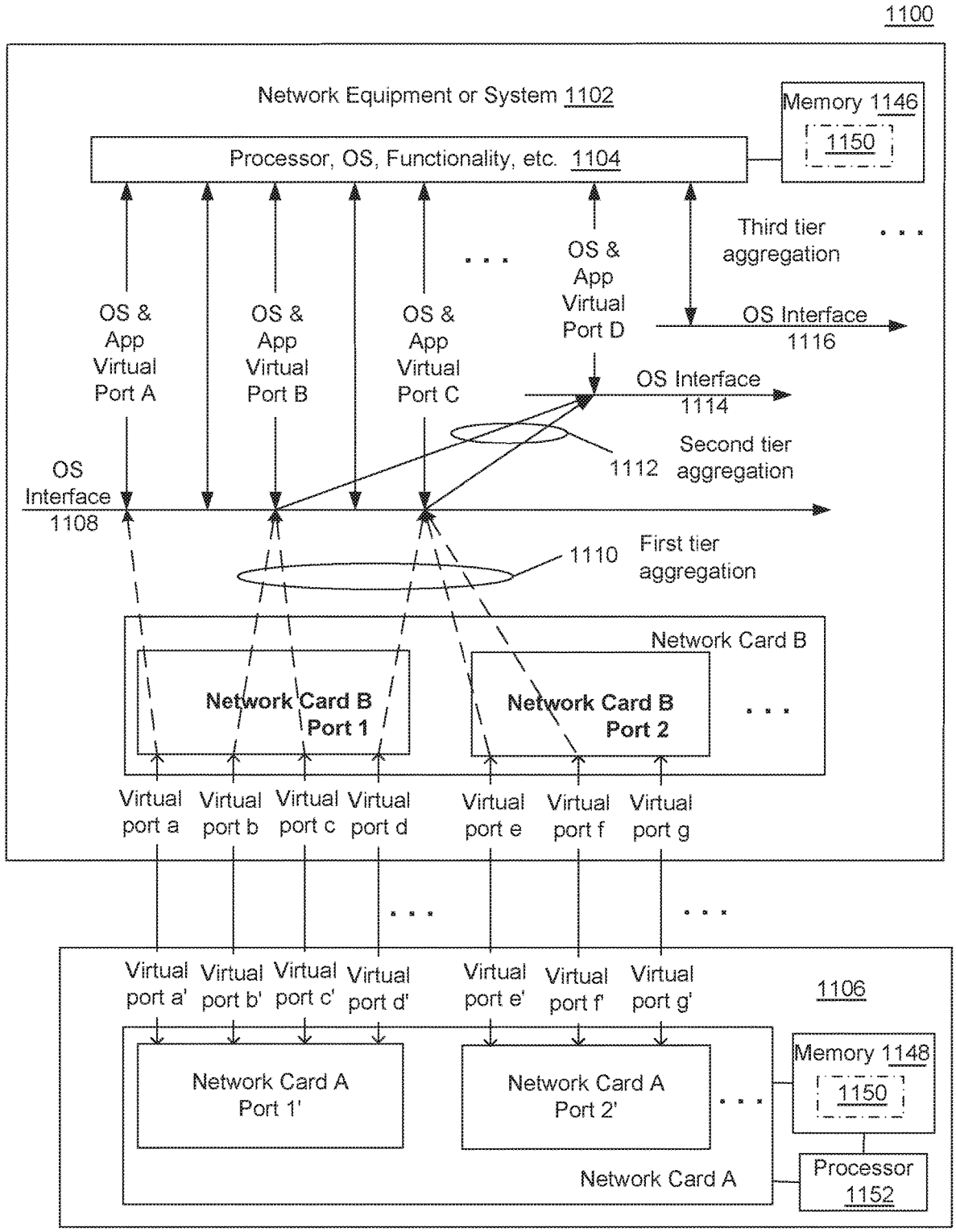
FIG. 11 is a block diagram illustrating an example of a communication network 1100 in accordance with the present invention.

FIG. 11 shows a block diagram that illustrates an example of a communication network 1100 in accordance with the present invention. Communication network 1100 can involve building or generating one or more virtualized elastic physical ports for, but not limited to, a fixed line network in accordance with various embodiments of the present disclosure.

Communication network 1100 can include, but is not limited to, a network equipment or system 1102 that is communicatively coupled with a network equipment or system 1106. In various embodiments, each of the network equipment 1102 and 1106 can be implemented as, but is not limited to, a computer system, a network switch system, a network router system, a network communication device, and a computing system.

Each of the network equipment 1102 and 1106 can include at least one network card (which may also be referred to as, but is not limited to, a network interface controller (NIC), a network interface card (NIC), a network adapter, a local area network (LAN) adapter, or physical network interface) that can include one or more physical network ports.

In addition, the network equipment 1102 and 1106 can each include other functionality that can include, but is not limited to, an operating system running on a processor (e.g., 1104 or 1152), one or more applications running on the processor, for example. In various embodiments, the communication network 1100 can be part of an autonomous system (AS), which refers to a network or a collection of networks that are administrated by an entity or organization, which may be an Internet service provider (ISP) or a customer entity that subscribes service from an ISP.

Specifically, the network equipment 1102 can include a processor 1104, network card B physical network ports 1 and 2 which can each be coupled with the processor 1104, and the memory 1146 coupled with (not shown) the processor 1104 and the network card B physical network ports 1 and 2. The network card B can be implemented with one or more physical network ports similar to the physical network ports 1 and 2.

In various embodiments, each of the physical network ports 1 and 2 can be implemented as a layer 2 network port, but are not limited to such. It is noted that the network equipment (or system) 1106 can be implemented in a manner similar to that described above with reference to the network equipment 1102. However, some of the elements are not shown in FIG. 11.

In various embodiments, the network equipment 1106 can include network card A physical network ports 1' and 2'. However, the network card A can be implemented with one or more physical network ports similar to the physical network ports 1' and 2'. In addition, in various embodiments, the network equipment 1106 can include memory 1148 which can be coupled to network card A and physical network ports 1' and 2'. Moreover, the network equipment 1106 can include a processor 1152 coupled with the memory 1148 and the network card A and physical network ports 1' and 2'.

In various embodiments, the memory 1146 of the network equipment 1102 stores instructions 1150 that, when executed by the processor 1104, cause the processor 1104 to perform a method to virtualizes one or more of the physical network ports of the network equipment 1102. Furthermore, in various embodiments, the memory 1148 of the network equipment 106 stores instructions 1150 that, when executed by the processor 1152, causes the processor 1152 to perform a method to virtualizes one or more of the physical network ports of the network equipment 1106.

In various embodiments, the network ports 1 and 1' are peering ports while the network ports 2 and 2' are also peering ports, but are not limited to such. The instructions 1150 (e.g., software, firmware, hardware, or any combination thereof) can be used to virtualization creation and management within communication network 1100 in various embodiments. Furthermore, in various embodiments, the instructions 1150 can be installed in one or more chips in a field-programmable gate array (FPGA) board and can operate at the physical level, but is not limited to such.

Within FIG. 11, a plurality of virtual ports are generated or created at one or more of the peering physical ports 1 and 1' along with the peering physical ports 2 and 2'. The generation of a plurality of virtual ports can be implemented in a wide variety of ways in accordance with various embodiments of the present disclosure.

For example, in various embodiments, at one or more of the peering physical ports 1 and 1' along with the peering physical ports 2 and 2', create a plurality of virtual ports that match, but is not limited to, the Institute of Electrical and Electronics Engineers (IEEE) 802.11 standard, except for the network port data transfer rate.

The data transfer rate of each virtual port can be a smaller data transfer rate than the maximum data transfer rate of the corresponding peering physical port (e.g., 1 and 1'). For instance, the data transfer rates of standard physical ports are 10 Mbps (megabit per second), 100 Mbps, 1 Gbps (gigabit per second), 40 Gbps, and 100 Gbps. However, in various embodiments, the traffic rate of a virtual port can be, but is not limited to, 2 Mbps, 33 Mbps, 560 Mbps, 24 Gbps, and 86 Gbps.

Furthermore, in various embodiments, the virtual port data speed/traffic rates can be defined, and through the IEEE 802.11 protocol and negotiation between peering virtual port a and a'; port b and b', for example. In addition, in various embodiments, the data transfer rate of each of the plurality of virtual ports (e.g., virtual ports a, b, c, and d) can be a fraction of the maximum data transfer rate of the corresponding physical network port (e.g., network card B port 1).

For example, within the communication network 1100, a virtualized port (e.g., Virtual port a) is defined to match, but is not limited to, the IEEE 802.11 protocol and the Virtual port a's transfer bit rate is changed to the negotiated rate (e.g., 11 gigabit per second (Gbps)). Specifically, in various embodiments, a physical port (e.g., network card B port 1) of a network equipment or system 1102 can be split into multiple virtual ports (e.g., virtual ports a, b, c, and d) that each match, but are not limited to, the IEEE 802.11 protocol. For example, if the network card B physical port 1 has a transfer bit rate of 100 megabit per second (Mbps), it can be split by various embodiments into one hundred virtual ports each having a transfer bit rate of 1 Mbps (which is currently not shown).

In various embodiments, once these one hundred virtual ports are established, any number of these virtual ports can be merged together by various embodiments in order to create a new larger data transfer rate virtual port able to handle a specific negotiated data transfer rate (e.g., 11 Gbps) for a particular connection or customer.

In addition, in various embodiments it is noted that the merging together of virtual ports can be accomplished across multiple physical ports of a network communication device. Moreover, in various embodiments the merging together of virtual ports can also be accomplished across different communication layers. After these types of virtualizations are performed, each physical port has been replaced by multiple virtualized ports.

In various embodiments, the virtualized ports can be used in, but is not limited to, all traffic management, port-based orchestrating, software defined networking (SDN), software defined wide area network (SD-WAN), and network virtualization. Furthermore, in various embodiments, the virtual ports can be utilized to build end to end traffic provisioning that easily controls quality of service (QoS) and increases network efficiency.

As noted above, the generation of a plurality of virtual ports can be implemented in a wide variety of ways in accordance with various embodiments of the present disclosure. For example, in various embodiments, a plurality of virtual ports (e.g., virtual ports e, f, and g) can be generated (or created) at the peering physical ports (2 and 2') through maintaining a MAC (media access control) forwarding table (e.g., which can be used for a layer 2 switch system) to control data package forwarding from physical port to virtual port.

In addition, a plurality of virtual ports (e.g., virtual ports e, f, and g) can be generated (or created) at the peering physical ports (2 and 2') through utilizing time slot to control the data transfer speed between the physical port to the virtual port. In various embodiments, since the physical port is "split" into multiple virtual ports. Then, for example, the base clock circle can be multiplied, like 5 millisecond (ms), that means one virtual port is ⅕ the maximum data speed of the peering physical port.

In various embodiments, time-division multiple access (TMDA) can be utilized to create (or generate) the virtualized ports, and the virtual port can be implemented having 1/x data speed of the maximum data speed of the peering physical port. Furthermore, each of the virtual ports is made to work or operate like a physical port. Since TDMA can be utilized to create or generate multiple virtual ports (e.g., virtual ports a, b, c, and d) in a physical port (e.g., network card B port 1), multiple virtual ports can be managed and combined to form a flexible virtual port.

Moreover, in various embodiments, the flexible virtual port can be created across with virtual ports (e.g., virtual ports d and e) that cross or involve a plurality of physical ports (network card B ports 1 and 2). Based on this functionality of the various embodiments, virtual fiber/circuits can be created and virtualization can occur across the telco network.

Within FIG. 11, in various embodiments, it is pointed out that Virtual Port A is an operating system (OS) and application level virtual network port, which can directly use virtual port a,a' via the OS interface 1108. Additionally, in various embodiments, Virtual Port B is also an OS and application level virtual network port, which can directly use merged (or aggregated) virtual ports b,b' and c,c' via the OS interface 1108.

When the OS 1104 views Virtual Port B, it just views a single port having the combined data transfer rate of virtual ports b,b' and c,c' but does not view the two virtual ports b,b' and c,c'. Moreover, in various embodiments, Virtual Port C is also an OS and application level virtual network port, which can directly use merged (or aggregated) virtual ports d,d' and e,e' and f,f' via the OS interface 1108.

Virtual Port C is generated by merging (or aggregating) multiple virtual ports (e.g., d,d' and e,e' and f,f') across two physical ports (e.g., network card B ports 1 and 2). Therefore, when the OS 104 views Virtual Port C, it just views a single port having the combined data transfer rate of virtual ports d,d' and e,e' and f,f' but does not view the three virtual ports b,b' and c,c'. In various embodiments, note that each of Virtual Ports B and C are the result of a first-tier aggregation 1110.

In various embodiments, Virtual Port D is also an OS and application level virtual network port, which can directly use merged (or aggregated) virtual ports b,b' and c,c' and d,d' and e,e' and f,f' via the OS interface 1114. Virtual Port D is generated by merging (or aggregating) multiple virtual ports (e.g., b,b' and c,c' and d,d' and e,e' and f,f') across two physical ports (e.g., network card B ports 1 and 2).

In addition, Virtual Port D is the result of a second-tier aggregation 1112 of the Virtual Ports B and C. Therefore, when the OS 1104 views Virtual Port D, it just views a single port having the combined data transfer rate of virtual ports b,b' and c,c' and d,d' and e,e' and f,f' but does not view the five virtual ports b,b' and c,c' and d,d' and e,e' and f,f'.

In various embodiments, there is no limit to the amount of aggregation tiers (e.g., third tier, fourth tier, etc.) that can be implemented within the communication network 1100. Furthermore, in various embodiments, note that each data transfer rate (e.g., which can be different data transfer rates) of the virtual ports (e.g., a,a' and b,b' and c,c' and d,d' and e,e' and f,f') can be combined in any manner to create or generate and define any data speed rate virtual port. In various embodiments, a virtual aggregated port can cross physical ports and be dynamic and virtualized. The operating system 1104 can get information from instructions 1150 of how many virtual ports are available along with their corresponding data transfer rates.

There are benefits associated with the functionality of communication network 1100 as described herein in accordance with various embodiments. For example, a virtualized network port (e.g., which works as a physical port) can bring flexible network orchestration. In addition, each physical network port can support multiple virtualized ports that function like physical ports and are able to deploy different applications and traffic to different virtual ports. Furthermore, different data speed rate can be defined or set in order to maintain quality of service (QoS) and control data traffic. Moreover, in various embodiments, more features can be added in different virtual ports for special management.

Figure 12:
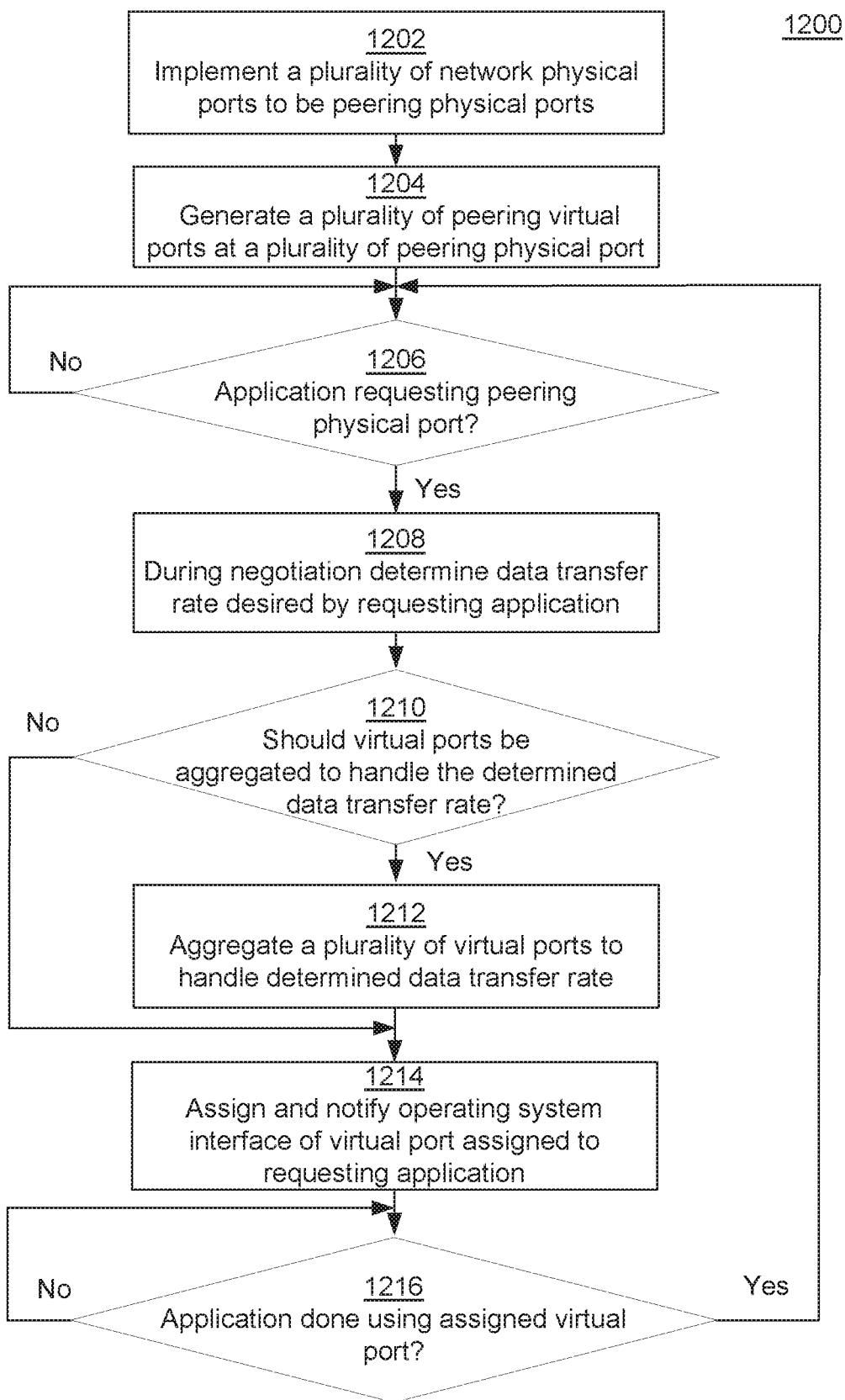
FIG. 12 is a flow chart illustrating an example of a method 1200 for virtualizing one or more physical network ports (or interfaces) in a communication network in accordance with the present invention.

FIG. 12 shows a flow chart that illustrates an example of a method 1200 for virtualizing one or more physical network ports (or interfaces) in a communication network in accordance with the present invention. Although specific operations are disclosed in FIG. 12, such operations are examples. Method 1200 may not include all of the operations illustrated by FIG. 12. Also, method 1200 may include various other operations and/or variations of the operations shown.

Likewise, the sequence of the operations of method 1200 can be modified. Not all of the operations in method 1200 may be performed. In various embodiments, one or more of the operations of method 1200 can be controlled or managed by software, by firmware, by hardware, or by any combination thereof, but is not limited to such.

Method 1200 can include processes of various embodiments of the present disclosure which can be controlled or managed by a processor(s) and electrical components under the control of computer or computing device readable and executable instructions or code. The computer or computing device readable and executable instructions (or code) may reside, for example, in data storage features such as computer or computing device usable volatile memory, computer or computing device usable non-volatile memory, and/or computer or computing device usable mass data storage. However, the computer or computing device readable and executable instructions (or code) may reside in any type of computer or computing device readable medium or memory (e.g., like those found within the computing system 1300 of FIG. 13).

At 1202, a plurality of network physical ports are implemented to be peering physical ports. Operation 1202 can be implemented in a wide variety of ways. For example, in various embodiments operation 1202 can be implemented in any manner similar to that described and/or shown by the present disclosure, but is not limited to such.

At 1204 of FIG. 12, a plurality of peering virtual ports can be generated at each of a plurality of peering physical ports and may be implemented at each peering physical port. Operation 1204 can be implemented in a wide variety of ways. For example, in various embodiments operation 1204 can be implemented in any manner similar to that described and/or shown by the present disclosure, but is not limited to such.

At 1206, a determination can be made as to whether an application is requesting use of a peering physical port. If so, method 1200 can proceed to 1208. However, if it is determined at 1206 that an application is not requesting use of a peering physical port, method 1200 can proceed to the beginning of 1206. The determination can be implemented in a wide variety of ways. For example, in various embodiments the determination can be implemented in any manner similar to that described and/or shown by the present disclosure, but is not limited to such.

At 1208 of FIG. 12, during negotiation of the peering physical port, a determination is made as to the data transfer rate desired by the requesting application to operate properly. The determination can be implemented in a wide variety of ways. For example, in various embodiments the determination can be implemented in any manner similar to that described and/or shown by the present disclosure, but is not limited to such.

At 1210, a determination is made as to whether a plurality of virtual ports should be aggregated in order to handle the determined data transfer rate of the requesting application. If so, method 1200 can proceed to 1212. However, if it is determined at 1210 that a plurality of virtual ports should not be aggregated in order to handle the determined data transfer rate of the requesting application (e.g., a single virtual port could handle the determined data transfer rate of the requesting application), method 1200 can proceed to operation 1214. The determination can be implemented in a wide variety of ways. For example, in various embodiments the determination can be implemented in any manner similar to that described and/or shown by the present disclosure, but is not limited to such.

At 1212 of FIG. 12, a plurality of virtual ports is aggregated in order to handle the determined data transfer rate of the requesting application. The aggregation can be implemented in a wide variety of ways. For example, in various embodiments the aggregation can be implemented in any manner similar to that described and/or shown by the present disclosure, but is not limited to such.

At 1214, the virtual port (e.g., aggregated or singular) can be assigned to the requesting application and the operating system interface is notified of the virtual port assigned to the requesting application. The assignment can be implemented in a wide variety of ways. For example, in various embodiments the assignment can be implemented in any manner similar to that described and/or shown by the present disclosure, but is not limited to such.

At 1216 of FIG. 12, a determination is made as to whether the application is done using the assigned virtual port. If so, method 1200 can proceed to the beginning of operation 1206. However, if it is determined at 1216 that the application is not done using the assigned virtual port, method 1200 can proceed to the beginning of operation 1216. It is noted that the determination can be implemented in a wide variety of ways. For example, in various embodiments the determination can be implemented in any manner similar to that described and/or shown by the present disclosure, but is not limited to such.

Figure 13:
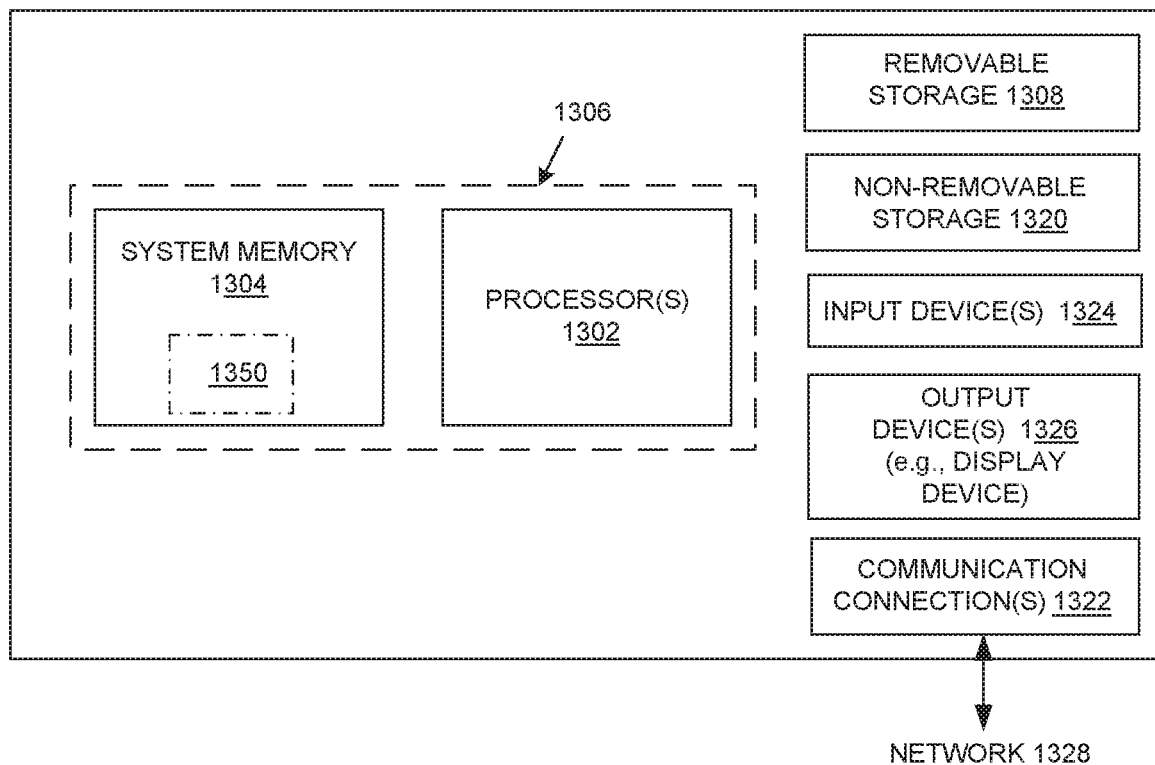
FIG. 13 is a block diagram illustrating an example of a computing system 1300 in accordance with the present invention.

FIG. 13 shows a block diagram that illustrates an example of a computing system 1300 in accordance with the present invention. In its most basic configuration, system 1300 can include at least one processing unit (or processor) 1302 for executing method 900, and memory 1304. This most basic configuration is illustrated in FIG. 13 by dashed line 1306. System 1300 may be implemented in a wide variety of ways in accordance with various embodiments of the present disclosure. For example, system 1300 can be implemented as, but is not limited to, a network switch system, a network router system, a network communication device, a network equipment, a computer system, a laptop computer system, a smartphone, a desktop computer system, and the like.

Reference has now been made in detail to the various embodiments of the present disclosure, examples of which are illustrated in the accompanying drawings. While described in conjunction with the various embodiments, it will be understood that these various embodiments are not intended to limit the present disclosure. On the contrary, the present disclosure is intended to cover alternatives, modifications and equivalents, which may be included within the scope of the present disclosure as construed according to the claims. Furthermore, in the preceding detailed description of various embodiments of the present disclosure, numerous specific details are set forth in order to provide a thorough understanding of the present disclosure. However, it will be recognized by one of ordinary skill in the art that the present disclosure may be practiced without these specific details or with equivalents thereof. In other instances, well-known methods, procedures, components, and circuits have not been described in detail so as not to unnecessarily obscure aspects of various embodiments of the present disclosure.

It is noted that although a method may be depicted herein as a sequence of numbered operations for clarity, the numbering does not necessarily dictate the order of the operations. It should be understood that some of the operations may be skipped, performed in parallel, or performed without the requirement of maintaining a strict order of sequence. The drawings showing various embodiments in accordance with the present disclosure are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the various embodiments in accordance with the present disclosure can be operated in any orientation.

Some portions of the detailed descriptions are presented in terms of procedures, logic blocks, processing, and other symbolic representations of operations on data bits within a computer memory. These descriptions and representations are used by those skilled in the data processing arts to effectively convey the substance of their work to others skilled in the art. In the present disclosure, a procedure, logic block, process, or the like, is conceived to be a self-consistent sequence of operations or instructions leading to a desired result. The operations are those utilizing physical manipulations of physical quantities. Usually, although not necessarily, these quantities take the form of electrical or magnetic signals capable of being stored, transferred, combined, compared, and otherwise manipulated in a computing system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "generating," "determining," "assigning," "aggregating," "utilizing," "virtualizing," "processing," "accessing," "executing," "storing," or the like, refer to the action and processes of a computer system, or similar electronic computing device or processor. The computing system, or similar electronic computing device or processor manipulates and transforms data represented as physical (electronic) quantities within the computer system memories, registers, other such information storage, and/or other computer readable media into other data similarly represented as physical quantities within the computer system memories or registers or other such information storage, transmission or display devices.

The technical solutions in the embodiments of the present application have been clearly and completely described in the prior sections with reference to the drawings of the embodiments of the present application. It should be noted that the terms "first," "second," and the like in the description and claims of the present invention and in the above drawings are used to distinguish similar objects and are not necessarily used to describe a specific sequence or order. It should be understood that these numbers may be interchanged where appropriate so that the embodiments of the present invention described herein can be implemented in orders other than those illustrated or described herein.

The functions described in the method of the present embodiment, if implemented in the form of a software functional unit and sold or used as a standalone product, can be stored in a computing device readable storage medium. Based on such understanding, a portion of the embodiments of the present application that contributes to the prior art or a portion of the technical solution may be embodied in the form of a software product stored in a storage medium, including a plurality of instructions for causing a computing device (which may be a personal computer, a server, a mobile computing device, or a network device, and so on) to perform all or part of the steps of the methods described in various embodiments of the present application. The foregoing storage medium includes: a USB drive, a portable hard disk, a read-only memory (ROM), a random-access memory (RAM), a magnetic disk, an optical disk, and the like, which can store program code.

The various embodiments in the specification of the present application are described in a progressive manner, and each embodiment focuses on its difference from other embodiments, and the same or similar parts between the various embodiments may be referred to another case. The described embodiments are only a part of the embodiments, rather than all of the embodiments of the present application. All other embodiments obtained by a person of ordinary skill in the art based on the embodiments of the present application without departing from the inventive skills are within the scope of the present application.

The above description of the disclosed embodiments enables a person skilled in the art to make or use the present application. Various modifications to these embodiments are obvious to a person skilled in the art, and the general principles defined herein may be implemented in other embodiments without departing from the spirit or scope of the present application. Therefore, the present application is not limited to the embodiments shown herein, but the broadest scope consistent with the principles and novel features disclosed herein.

What is claimed is:

1. A network device, comprising:
a plurality of physical transceiver ports, the plurality of physical transceiver ports to transfer data across a network at a predetermined fixed data rate; and
a virtual circuit coupled to the plurality of physical transceiver ports, the virtual circuit to:
receive a first transfer request from a processor to transmit a first incoming data stream at a first non-predetermined data rate;
establish a first virtual port to receive the first incoming data stream;
select one or more physical transceiver ports from the plurality of physical transceiver ports to form one or more selected physical transceiver ports in response to the first transfer request where the one or more selected physical transceiver ports have a total predetermined fixed data rate that is greater than the first non-predetermined data rate;
receive the first incoming data stream from the processor through the virtual port after the one or more physical transceiver ports have been selected;
form one or more output data streams to run at the predetermined fixed data rate, the one or more output data streams to incorporate the data from the first incoming data stream, the data from the first incoming data stream that is incorporated within the one or more output data streams being timed to selected pulses within a transmit clock signal that runs at the predetermined fixed data rate; and
forward the one or more output data streams to the one or more selected physical transceiver ports.

2. The network device of claim 1, wherein when the first non-predetermined data rate of the first incoming data stream is less than the predetermined fixed data rate of a physical transceiver port, the virtual circuit to select a physical transceiver port from the plurality of physical transceiver ports to form a selected physical transceiver port that has a predetermined fixed data rate that is greater than the first non-predetermined data rate of the first incoming data stream.

3. The network device of claim 2, wherein the virtual circuit to further form an output data stream to run at the predetermined fixed data rate, the output data stream to incorporate the data from the incoming data stream, the data from the incoming data stream incorporated within the output data stream being timed to selected pulses within the transmit clock signal.

4. The network device of claim 3, wherein virtual circuit to further:
receive a second transfer request from the processor to transmit a second incoming data stream at a second non-predetermined data rate that is less than the predetermined fixed data rate of the selected physical transceiver port;
establish a second virtual port to receive the second incoming data stream; and
determine whether the selected physical transceiver port has an available data rate that is greater than the second non-predetermined data rate.

5. The network device of claim 4, wherein the virtual circuit to further:
receive the second incoming data stream at the second non-predetermined data rate from the processor after determining the available data rate;
when the available data rate of the selected physical transceiver port is greater than the second non-predetermined data rate, generate a revised output data stream to incorporate the data from the first incoming data stream and the second incoming data stream where the data from the first incoming data stream and the second incoming data stream are timed to selected transmit clock signals; and
forward the revised output data stream to the selected physical transceiver port.

6. The network device of claim 5, wherein the predetermined fixed data rate has a data rate of x bits per second, and the virtual circuit to sub-divide the predetermined fixed data rate of x bits per second of a physical transceiver port into fractional parts, assigns the fractional parts to the first and second input data streams with non-predetermined data rates that are less than the predetermined fixed data rate of the physical transceiver port, and combine the fractional parts such that the combined bits per second of the combined data stream are equal to or less than the predetermined fixed data rate of x bits per second of the physical transceiver port.

7. The network device of claim 5, wherein determining whether the selected physical transceiver port has an available data rate that is greater than the second non-predetermined data rate includes subtracting the first non-predetermined data rate from the predetermined fixed data rate of the first incoming data stream to obtain the available data rate, and comparing the available data rate to the second non-predetermined data rate.

8. The network device of claim 1, wherein when the non-predetermined data rate of the incoming data stream is greater than the predetermined fixed data rate of a physical transceiver port, the virtual circuit to:
 establish a virtual port to receive the incoming data stream from the processor; and
 select two or more physical transceiver ports from the plurality of physical transceiver ports where the two or more selected physical transceiver ports have a combined predetermined fixed data rate that is greater than the non-predetermined data rate of the incoming data stream.

9. The network device of claim 8, wherein the virtual circuit to further split the incoming data stream received from the virtual port into two or more split data streams that correspond with the two or more selected physical transceiver ports, each of the two or more split data streams having non-predetermined data rates that are smaller than the predetermined fixed data rate.

10. The network device of claim 9, wherein the virtual circuit to further form two or more output data streams to run at the predetermined fixed data rate, the two or more output data streams to incorporate the data from the two or more split data streams, the data from the split data streams incorporated within the two or more output data streams being timed to selected pulses within the transmit clock signal.

11. A method of operating a network device, the method comprising:
 receiving a first transfer request from a processor to transmit a first incoming data stream at a first non-predetermined data rate;
 establishing a virtual port to receive the first incoming data stream;
 selecting one or more physical transceiver ports that transmit data across a network at a predetermined fixed data rate from a plurality of physical transceiver ports to form one or more selected physical transceiver ports where the one or more selected physical transceiver ports have a total predetermined fixed data rate that is greater than the first non-predetermined data rate;
 receiving the first incoming data stream from the processor through the virtual port after the one or more physical transceiver ports have been selected;
 forming one or more output data streams to run at the predetermined fixed data rate, the one or more output data streams to incorporate the data from the first incoming data stream, the data from the first incoming data stream that is incorporated within the one or more output data streams being timed to selected pulses within a transmit clock signal that runs at the predetermined fixed data rate; and
 forwarding the one or more output data streams to the one or more selected physical transceiver ports.

12. The method of claim 11, further comprising when the first non-predetermined data rate of the first incoming data stream is less than the predetermined fixed data rate of a physical transceiver port:
 selecting a physical transceiver port from the plurality of physical transceiver ports to form a selected physical transceiver port where the selected physical transceiver port has a predetermined fixed data rate that is greater than the first non-predetermined data rate of the first incoming data stream;
 establishing a virtual port to receive the incoming data stream; and
 forming an output data stream to run at the predetermined fixed data rate that corresponds with the selected physical transceiver port, the output data stream to incorporate the data from the incoming data stream, the data from the incoming data stream incorporated within the output data stream being timed to selected pulses within the transmit clock signal.

13. The method of claim 12, further comprising:
 receiving a second request from the processor to transmit a second incoming data stream at a second non-predetermined data rate that is less than the predetermined fixed data rate of the selected physical transceiver port;
 determining whether the selected physical transceiver port has an available data rate that is greater than the second non-predetermined data rate;
 receiving the second incoming data stream from the processor after determining the available data rate;
 when the available data rate of the selected physical transceiver port is greater than the second non-predetermined data rate, generating a reformed output data stream to incorporate the data from the first incoming data stream and the second incoming data stream where the data from the first incoming data stream and the second incoming data stream are timed to selected transmit clock signals; and
 forwarding the reformed output data stream to the selected physical transceiver port.

14. The method of claim 11, further comprising when the first non-predetermined data rate of the first incoming data stream is greater than the predetermined fixed data rate of a physical transceiver port:
 selecting two or more physical transceiver ports from the plurality of physical transceiver ports where the two or more selected physical transceiver ports have a combined predetermined fixed data rate that is greater than the non-predetermined data rate of the incoming data stream;
 establishing a virtual port to receive the incoming data stream; and
 splitting the incoming data stream received from the virtual port into two or more split data streams that correspond with the two or more selected physical transceiver ports, each of the two or more split data streams having a smaller non-predetermined data rates than the non-predetermined data rate of the incoming data stream.

15. The method of claim 14, further comprising forming two or more output data streams to run at the predetermined fixed data rate, the two or more output data streams to incorporate the data from the two or more split data streams, the data from the split data streams incorporated within the two or more output data streams being timed to selected pulses within the transmit clock signal.

16. A network system, comprising:
 a network;
 a first network device coupled to the network, the first network device having:

a plurality of first physical transceiver ports, the plurality of first physical transceiver ports to transfer data across the network at a predetermined fixed data rate; and
a first virtual circuit coupled to the plurality of first physical transceiver ports, the first virtual circuit to:
receive a first transfer request from a processor to transmit a first incoming data stream at a first non-predetermined data rate;
establish a first virtual port to receive the first incoming data stream;
select one or more first physical transceiver ports from the plurality of first physical transceiver ports to form one or more selected first physical transceiver ports where the one or more selected first physical transceiver ports have a total predetermined fixed data rate that is greater than the first non-predetermined data rate;
receive the first incoming data stream from the processor through the first virtual port after the one or more first physical transceiver ports have been selected;
form one or more output data streams to run at the predetermined fixed data rate, the one or more output data streams to incorporate the data from the first incoming data stream, the data from the first incoming data stream that is incorporated within the one or more output data streams being timed to selected pulses within a transmit clock signal that runs at the predetermined fixed data rate; and
forward the one or more output data streams to the one or more selected physical transceiver ports; and
a second network device coupled to the network, the second network device having:
a plurality of second physical transceiver ports, the plurality of second physical transceiver ports to transfer data across the network; and
a second virtual circuit coupled to the plurality of second physical transceiver ports, the second virtual circuit to:
receive a first network request from the first virtual circuit to receive the one or more output data streams at the first non-predetermined data rate from the one or more selected physical transceiver ports;
select one or more second physical transceiver ports from the plurality of second physical transceiver ports to form one or more selected second physical transceiver ports that correspond with the one or more selected first physical transceiver ports in response to the request from the first virtual circuit where the one or more selected second physical transceiver ports have a combined predetermined fixed data rate that is greater than the first non-predetermined data rate; and
receive the one or more output data streams from the first network device with the selected one or more second physical transceiver ports.

17. The network system of claim 16, wherein the second virtual circuit to:
extract the data from the first incoming data stream that is incorporated within the one or more output data streams from the one or more output data streams to form one or more reconstituted data streams that run at the first non-predetermined fixed data rate, the one or more reconstituted data streams substantially matching the one or more first incoming data streams; and
forward the one or more reconstituted data streams to a second processor.

18. The network system of claim 17, wherein when the first non-predetermined data rate of the first incoming data stream is less than the predetermined fixed data rate of a physical transceiver port, the first virtual circuit to select a first physical transceiver port from the plurality of first physical transceiver ports to form a selected first physical transceiver port where the selected first physical transceiver port has a predetermined fixed data rate that is greater than the first non-predetermined data rate of the first incoming data stream, the second virtual circuit to select a second physical transceiver port from the plurality of second physical transceiver ports to form a selected second physical transceiver port where the selected second physical transceiver port has a corresponding selected first physical transceiver port, and a predetermined fixed data rate that is greater than the first non-predetermined data rate of the first incoming data stream.

19. The network system of claim 17, wherein when the first non-predetermined data rate of the first incoming data stream is greater than the predetermined fixed data rate of a physical transceiver port, the first virtual circuit to select two or more first physical transceiver ports from the plurality of first physical transceiver ports where the two or more selected first physical transceiver ports have a combined predetermined fixed data rate that is greater than the non-predetermined data rate of the incoming data stream, the second virtual circuit to select two or more second physical transceiver ports from the plurality of second physical transceiver ports that correspond with the selected two or more first physical transceiver ports where the two or more selected second physical transceiver ports have a combined predetermined fixed data rate that is greater than the non-predetermined data rate of the incoming data stream.

20. A non-transitory computer-readable storage medium having embedded therein program instructions, which when executed by a processor causes the processor to execute a method of operating a network device, the method comprising:
receiving a first transfer request from a processor to transmit a first incoming data stream at a first non-predetermined data rate;
establishing a virtual port to receive the first incoming data stream;
selecting one or more physical transceiver ports that transmit data across a network at a predetermined fixed data rate from a plurality of physical transceiver ports to form one or more selected physical transceiver ports where the one or more selected physical transceiver ports have a total predetermined fixed data rate that is greater than the first non-predetermined data rate;
receiving the first incoming data stream from the processor through the virtual port after the one or more physical transceiver ports have been selected;
forming one or more output data streams to run at the predetermined fixed data rate, the one or more output data streams incorporate the data from the first incoming data stream, the data from the first incoming data stream that is incorporated within the one or more output data streams being timed to selected pulses within a transmit clock signal that runs at the predetermined fixed data rate; and forwarding the one or more output data streams to the one or more selected physical transceiver ports.

\* \* \* \* \*